United States Patent
Schreckenberger

(10) Patent No.: US 6,453,882 B2
(45) Date of Patent: Sep. 24, 2002

(54) COMPACT FUEL SUPPLY UNIT FOR AN INTERNAL COMBUSTION ENGINE OF A MOTOR VEHICLE

(75) Inventor: Dieter Schreckenberger, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/734,749

(22) Filed: Dec. 12, 2000

(30) Foreign Application Priority Data

Dec. 22, 1999 (DE) ..................... 299 22 474 U

(51) Int. Cl.$^7$ ............................. F02M 37/04
(52) U.S. Cl. ...................... 123/509; 123/514
(58) Field of Search ................ 123/509, 514, 123/457, 511, 497; 417/360; 137/565.01, 565.13

(56) References Cited

U.S. PATENT DOCUMENTS 5,392,750 A * 2/1995 Laue et al. ................. 123/509
5,769,061 A * 6/1998 Nagata et al. .............. 123/509
5,782,223 A * 7/1998 Yamashita et al. .......... 123/510
6,062,203 A * 5/2000 Takahashi et al. .......... 123/509

FOREIGN PATENT DOCUMENTS

DE            42 42 242 A1    6/1994

\* cited by examiner

*Primary Examiner*—Willis R. Wolfe
*Assistant Examiner*—Mahmoud Gimie
(74) *Attorney, Agent, or Firm*—Michael J. Striker

(57) ABSTRACT

The fuel supply unit has a fuel feed device (12) arranged in a fuel tank of a motor vehicle. The fuel feed device (12) feeds fuel from the fuel tank (10) to the internal combustion engine. A fuel filter (16), a non-return valve (18) and a pressure regulator (20) are arranged in the fuel tank (10) and in a fuel line connecting the fuel feed device (12) and the engine. These components are mounted on a plate-shaped plastic supporting member (36), in which hydraulic connections between the fuel feed device (12) and the components and/or between the components are formed. A covering element (46) is connected tightly with the supporting member (36) so as to form a passage (48) between it and the supporting member (36) for hydraulic connection of the fuel feed device (12) with the main filter (16).

6 Claims, 3 Drawing Sheets

COMPACT FUEL SUPPLY UNIT FOR AN INTERNAL COMBUSTION ENGINE OF A MOTOR VEHICLE

BACKGROUND OF THE INVENTION

1. Field of the Invention

The present invention relates to a fuel supply unit for an internal combustion engine of a motor vehicle and, more particularly, to a fuel supply unit comprising a fuel feed device by which fuel from a fuel tank is fed to the internal combustion engine, a fuel filter, a non-return valve and a fuel feed pressure regulator, in which the fuel filter, the non-return valve and the fuel feed pressure regulator are connected with each other in a fuel feed line.

2. Prior Art

This type of fuel supply unit is described in German Patent Document DE 42 42 242 A1. This fuel supply unit has a fuel feed device arranged in a fuel tank for an internal combustion engine. Other components or parts of the fuel supply unit, which include a fuel filter, a non-return valve and a fuel feed pressure regulator, are arranged in a fuel feed line. These components or parts are connected hydraulically with each other and connected by means of a plastic pot-shaped supporting member. The pot-shaped supporting member has a comparatively large volume, whereby the fuel supply unit is a comparatively large structure. Thus a comparatively large amount of space, which is then no longer available in the fuel tank, is taken up by the fuel supply unit. The hydraulic connection between the fuel supply unit and the other components and/or the components with each other occurs within the pot-shaped supporting element or by means of separate lines.

SUMMARY OF THE INVENTION

It is an object of the present invention to provide an improved fuel supply unit of the above-described kind, which is more compact than the prior art fuel supply unit of the aforesaid type and which thus takes up less room in the fuel tank.

According to the invention the fuel supply unit comprises a fuel feed device arranged in a fuel tank to feed fuel from the fuel tank to the internal combustion engine; components arranged in a fuel feed line between the fuel feed device and the internal combustion engine and comprising a fuel filter, a non-return valve and a pressure regulator and a plastic supporting member for connecting the components with each other. The plastic supporting member is at least approximately plate-shaped and hydraulic connections for connecting the components with each other and with the fuel feed device are formed in the plastic supporting member.

The fuel supply unit according to the invention has the advantage that the connection between the fuel feed device and the other components of the fuel supply unit occurs by a space-saving supporting member, on which the fuel feed device and the other components are connected hydraulically with each other and the other components are also hydraulically connected with each other, so that no separate connecting lines are required.

Various preferred embodiments of the fuel supply unit according to the invention are described in detail hereinbelow.

In a preferred embodiment a covering element is tightly connected with the plastic supporting member so as to form a passage extending between it and the plastic supporting member, which provides one of the hydraulic connections. The covering element comprises a plastic material and is welded or glued with the plastic supporting member.

In another embodiment the plastic supporting member is provided with an outlet connector formed in one piece with the plastic supporting member, which provides another hydraulic connections.

In another preferred embodiment of the fuel supply unit the non-return valve is provided in the outlet connector and comprises a valve seat provided in the outlet connector and a spring-loaded valve element cooperating with the valve seat. The pressure regulator can also be provided in the outlet connector.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
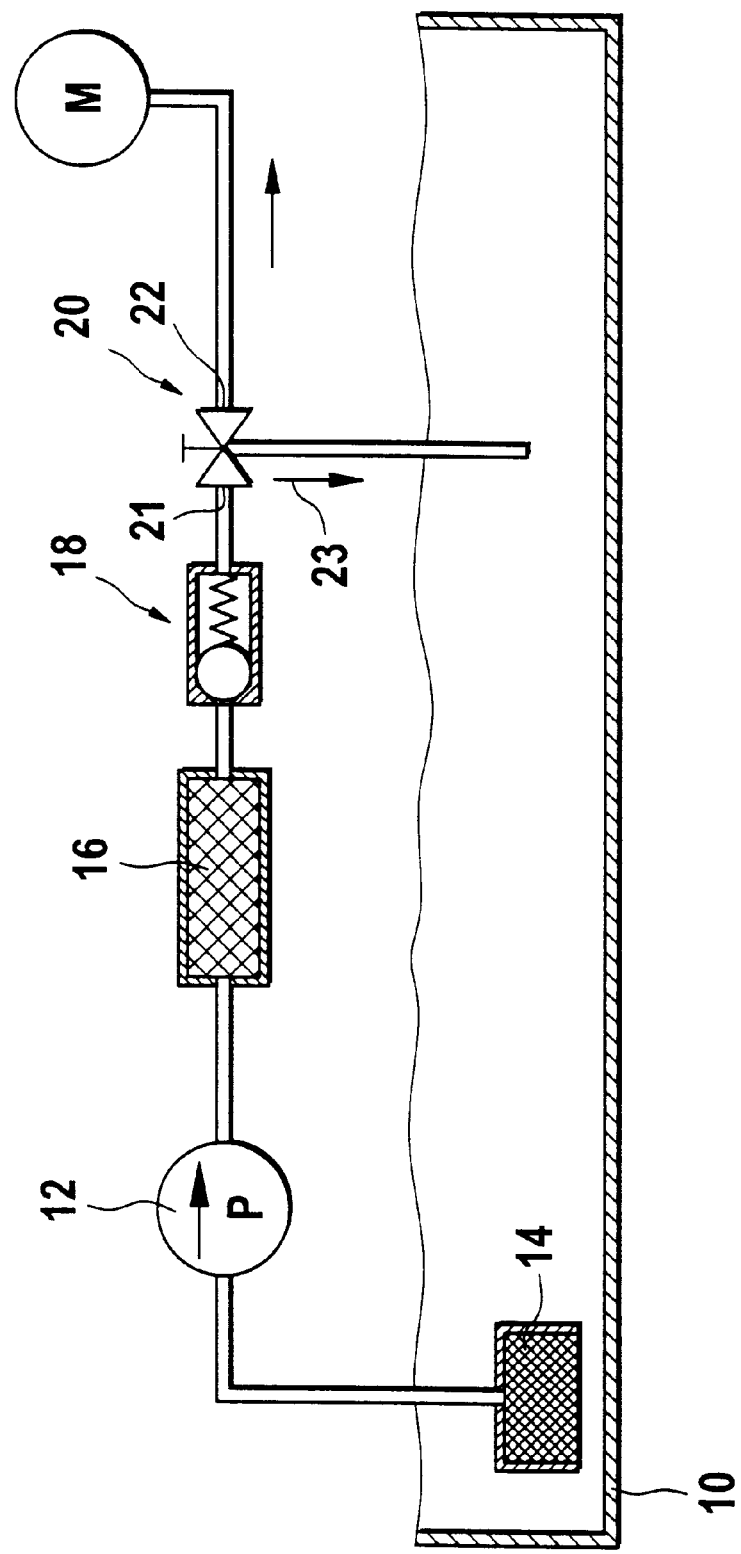
FIG. 1 is a diagrammatic view of a hydraulic circuit of a fuel supply unit for supplying fuel to an internal combustion engine.

A hydraulic circuit for the fuel supply unit of an internal combustion engine is shown in FIG. 1. The fuel supply unit has a fuel feed device 12 arranged in a a fuel tank 10 of the motor vehicle, by which fuel is fed from the tank 10 to an injection unit of the internal combustion engine of the motor vehicle. The fuel feed device 12 draws fuel from the fuel tank 10 through a pre-filter 14. Various other components of the fuel supply unit are arranged in a fuel line between the fuel feed device 12 and the internal combustion engine. These other components are advantageously arranged in the fuel tank 10. A main filter 16 is arranged downstream of the fuel feed device 12. The main filter 16 has a filtering element that has a smaller pore size than that of the pre-filter 14. A non-return valve 18 is arranged downstream of the main filter 16, by which it is guaranteed that fuel can only flow in the direction of the internal combustion engine from the fuel feed device 12, not however in the reverse direction from the internal combustion engine back to the fuel feed device 12. A pressure regulator 20 is arranged downstream of the non-return valve 18, by which the pressure of the fuel at the injection unit of the internal combustion engine is controlled. The pressure regulator 20 has an inlet 21, which communicates with the fuel feed device 12 via the main filter 16; the non-return valve 18, an outlet 22, which leads to the internal combustion engine; and a return 23, which opens into the fuel tank 10. Fuel from the fuel feed device 12 is fed back through the return 23 under control of the regulator 20, when the pressure increased over a predetermined pressure value.

Figure 2:
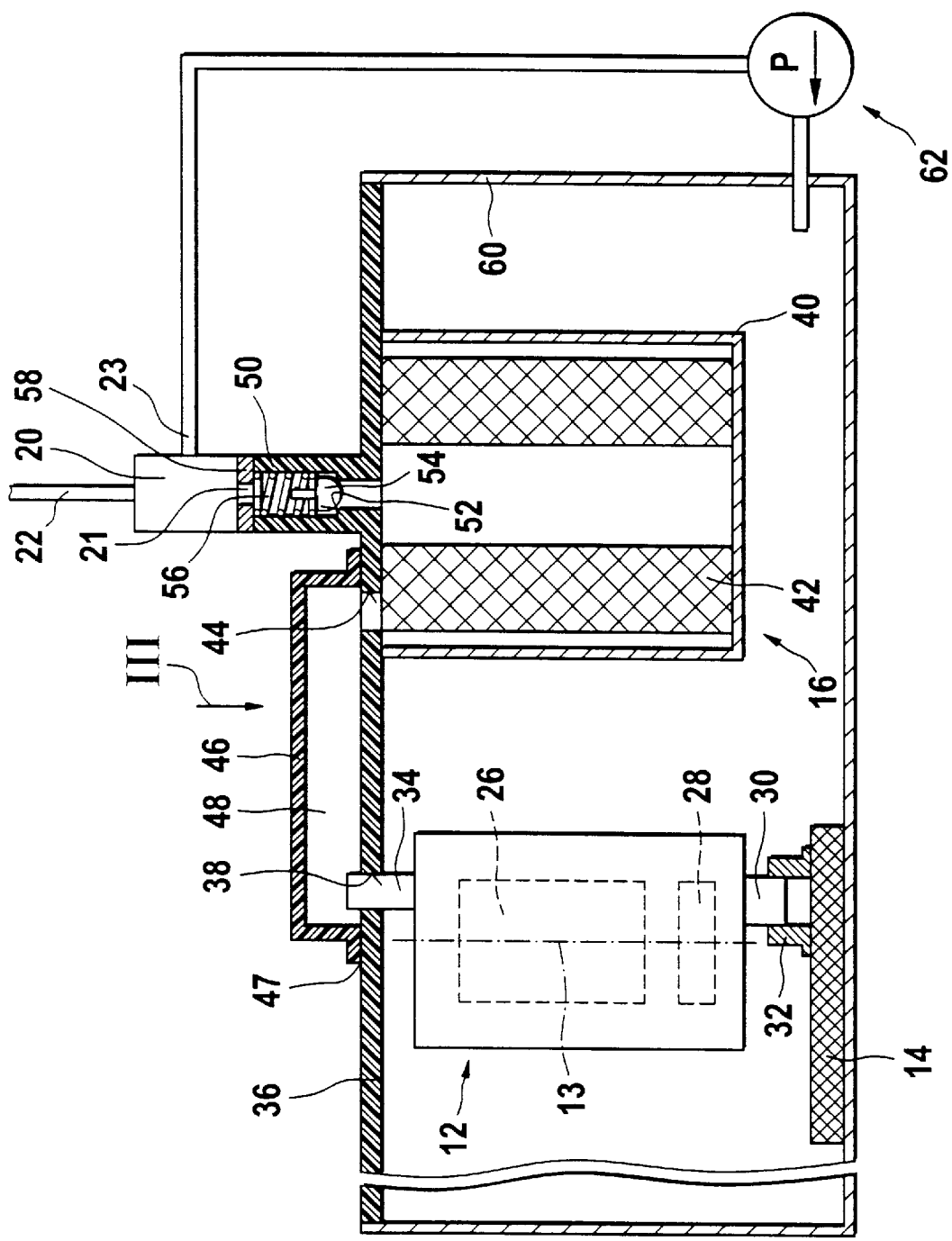
FIG. 2 is a detailed cross-sectional view through a preferred embodiment of a fuel supply unit according to the invention.
Figure 3:
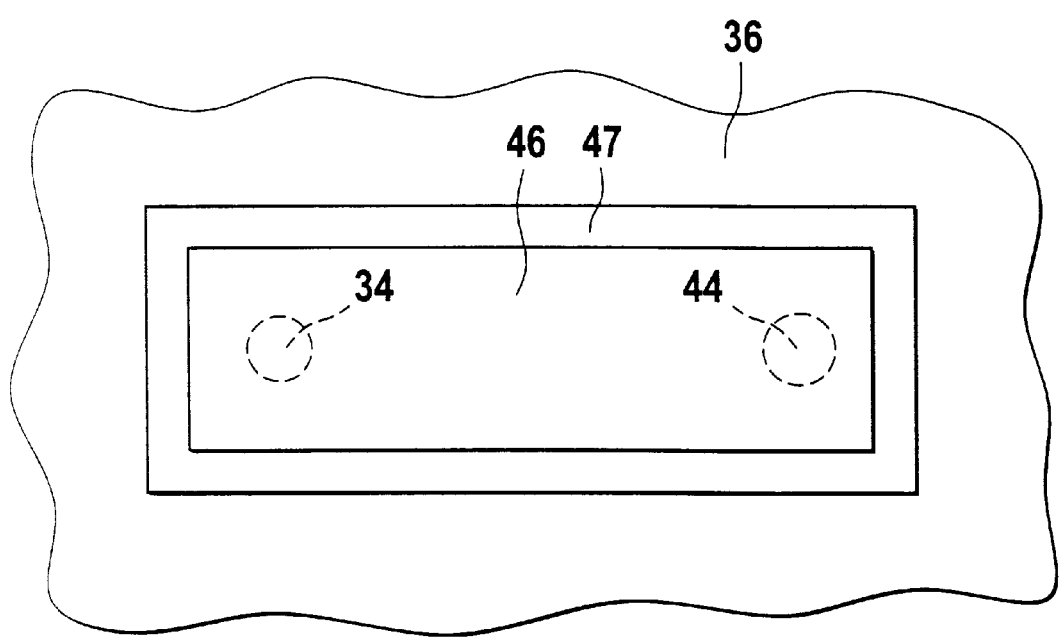
FIG. 3 is a diagrammatic top plan view of the fuel supply unit shown in FIG. 2 in the direction of the arrow Ill.

A preferred embodiment of the fuel supply unit according to the invention is shown in FIGS. 2 and 3. The fuel feed device 12 has a drive portion 26, which can be in the form of an electric motor, and a feed device portion 28, which are arranged in a common housing. The fuel feed device 12 has a suction or inlet connector 30 arranged on the suction side, on which the pre-filter is mounted by means of a connecting member 32. The fuel feed device 12 has a high pressure connector 34 on its high pressure side.

The fuel feed device 12 and the other components of the fuel supply unit arranged in the fuel fed line, which include the fuel filter 16, the non-return valve 18 and the pressure regulator 20, are connected with each other by means of a plate-like supporting member 36, which is called in the following a distributor plate. The distributor plate 36 comprises a fuel-resistant plastic material and can be made by injection molding. The distributor plate 36 is at least approximately flat or planar. The fuel feed device 12 is arranged in its location in the fuel tank 10 in such a manner that it extends at least approximately perpendicular to the longitudinal axis 13 of the fuel feed device 12 and thus is at least approximately horizontal. In the vicinity of the fuel feed device 12 the distributor plate 36 has an opening 38, through which the high pressure connector 34 of the fuel feed unit extends. The high pressure connector 34 extends through the opening 38 of the distributor plate 36 with as little as possible a radial play, whereby no sealing element can be arranged between the high pressure connector 34 and the opening 38.

The main filter 16 is arrange next to the fuel feed device 12 and for example has a pot-shaped housing 40, in which a filter element 42 is arranged. The housing 40 can be open on its upper end. It is connected from below to the distributor plate 36 and is connected tightly in an unshown manner with the distributor plate 36, so that a closed interior space is bounded by the housing 40 and the distributor plate 36. The housing 40 can be closed on its upper end, but provided with a dirty-side inlet and a clean-side outlet. In the illustrated embodiment the housing 40 is open on its upper end. The distributor plate 36 has a cross-section corresponding to the cross-section of the housing 40 of the main filter 16 in the vicinity of the main filter 16, so that it contacts tightly with its edge on the distributor plate 36. An opening 44 is provided in the distributor plate 36, which is connected with the dirty-side inlet of the main filter 16.

A cover element 46 is tightly or sealingly connected with the distributor plate 36 on its top side over the opening 38, through which the high pressure connector 34 of the fuel feed device 12 extends, and the opening 44 in the main filter 16. The cover element 46 is provided with a protruding portion, in which a passage 48 is formed, through which fuel can flow from the high pressure connector 34 of the fuel feed device 12 into the main filter 16. In FIG. 3 a plan view of a distributor plate 36 with the cover element 46 is provided. The cover element 46 comprises the distributor plate 36 comprising plastic material and is connected tightly with the distributor plate 36 around its peripheral edge 47, for example by welding or adhesive means.

An outlet connector 50 is formed on the distributor plate 36 projecting up from it, in which the clean-side outlet of the main filter 16 opens. A non-return valve 18 is provided in the outlet connector 50. The non-return valve 18 comprises a valve seat 52 formed in the connector 50 below a cross-sectional constriction in it and a valve element 54 arranged slidably in the outlet connector 50, which cooperates with the valve seat 52 and which is urged by a pre-compressed spring 56 against the valve seat 52. A spring bearing disk 58 can be inserted in the outlet connector 50 for support of the spring 56, which, for example, can be pressed or jammed into the outlet connector 50.

The high pressure regulator 20 is mounted on the outlet connector 50, so that the high pressure connector forms the inlet 21 for the pressure regulator. The pressure regulator 20 can be a complete structural unit, on which connectors for the inlet 21, the outlet 22 and the return 23 are provided. Alternatively the pressure regulator 20 can be integrated in the distributor plate 36, especially in the outlet connector 50, so that the connectors 21, 22 and 232 are part of the distributor plate 36. The pressure regulator can, for example, have a spring-loaded control element, which is acted on by pressure at the inlet 21, which cooperates with a valve seat and by which the inlet 21 is connected with the return 23 when a predetermined pressure is exceeded. Alternatively the pressure regulator 20 can also have a membrane acted on by pressure at the inlet 21, which cooperates with a seat seal and by which the insert 21 is connected with the return 23 when a predetermined set value of the pressure is exceeded.

The distributor plate 36 can be formed as a covering element for a supply container 60 arranged in the fuel tank, which has a substantially smaller volume than the fuel tank 10. Fuel is then supplied from the fuel tank 10 by means of a suction pump 62 in the supply container 60, so that a sufficient fuel volume is present in it, from which the fuel feed device 12 can draw fuel. The suction jet pump 62 can be connected with the return 23 of the pressure regulator 20. The pressure regulator 20 fulfills the same functions as a pressure limiting valve and prevents an impermissibly higher fuel pressure in the injector unit or in the fuel line between the fuel feed device 12 and the injector unit, when fuel is fed back through the return connection 23 to the fuel tank 10 under control of the pressure regulator when the predetermined set pressure limit is exceeded. This type of impermissibly high pressure would otherwise damage the components of the fuel supply unit.

The disclosure in German Patent Application 299 22 474.0 of Dec. 22, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a fuel supply unit for an internal combustion engine of a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A fuel supply unit for an internal combustion engine of a motor vehicle, said fuel supply unit comprising
a fuel tank (10);
a fuel feed device (12) arranged in the fuel tank (10) and comprising means for feeding fuel from the fuel tank (10) to the internal combustion engine;
components including a fuel filter (16), a non-return valve (18) and a pressure regulator (20) and arranged in a fuel feed line connected between the fuel feed device (12) and the internal combustion engine; and
a plastic supporting member (36) for connecting the components with each other;
wherein said plastic supporting member (36) is at least approximately plate-shaped and hydraulic connections for connecting said components with each other and with said fuel feed device are formed in the plastic supporting member (36).

2. The fuel supply unit as defined in claim 1, further comprising a covering element (46) tightly connected with the plastic supporting member (36) and wherein a passage (48) is provided extending between the covering element (46) and plastic supporting member (36) which provides one of said hydraulic connections.

3. The fuel supply unit as defined in claim 2, wherein the covering element (46) comprises a plastic material and is welded or glued with the plastic supporting member (36).

4. The fuel supply unit as defined in claim 1, wherein the plastic supporting member (36) is provided with an outlet connector (50) formed in one piece with said plastic supporting member, said outlet connector (50) providing one of said hydraulic connections.

5. The fuel supply unit as defined in claim 4, wherein the non-return valve (18) is provided in said outlet connector (50) and said non-return valve (18) comprises a valve seat (52) provided in said outlet connector (50) and a spring-loaded valve element (54) cooperating with said valve seat (52).

6. The fuel supply unit as defined in claim 4 or 5, wherein said pressure regulator (20) is provided in said outlet connector (50).

* * * * *